United States Patent [19]
Gormish

[11] Patent Number: 6,043,802
[45] Date of Patent: Mar. 28, 2000

[54] RESOLUTION REDUCTION TECHNIQUE FOR DISPLAYING DOCUMENTS ON A MONITOR

[75] Inventor: Michael J. Gormish, Los Altos, Calif.

[73] Assignees: Ricoh Company, Ltd., Tokyo, Japan; Ricoh Corporation, West Caldwell, N.J.

[21] Appl. No.: 08/767,865

[22] Filed: Dec. 17, 1996

[51] Int. Cl.[7] ..................................................... G09G 5/26
[52] U.S. Cl. .......................... 345/127; 345/129; 345/147; 382/258; 382/259; 382/298
[58] Field of Search .................... 345/115, 127, 345/131, 132, 147, 149; 382/298, 299, 300, 258, 259

[56] References Cited

U.S. PATENT DOCUMENTS

| | | | |
|---|---|---|---|
| 4,751,507 | 6/1988 | Hama et al. | 345/131 |
| 5,050,229 | 9/1991 | Barski et al. | 382/258 |
| 5,125,045 | 6/1992 | Murakami et al. | 382/270 |
| 5,231,679 | 7/1993 | Matsuura et al. | 382/232 |
| 5,335,290 | 8/1994 | Cullen et al. | 382/9 |
| 5,465,304 | 11/1995 | Cullen et al. | 382/176 |
| 5,592,571 | 1/1997 | Peters | 382/261 |
| 5,619,594 | 4/1997 | Melen | 392/233 |
| 5,623,345 | 4/1997 | Merchant et al. | 358/407 |
| 5,650,799 | 7/1997 | Melen | 345/172 |
| 5,787,196 | 7/1998 | Yair et al. | 382/178 |

OTHER PUBLICATIONS

O'Gorman, Lawrence and Guy A. Story, "Subsampling Text Images," ICDAR, AT&T Bell Labs, 1991, pp. 219–227.

Naiman, Avi C., "The Use of Grayscale for Improved Character Presentation," Abstract 1991.

Peleg et al., "A Unified Approach to the Change of Resolution: Space and Gray–Level," IEEE Transactions on Pattern Analysis and Machine Intelligence, vol. II, No. 7, Jul. 1989, pp.739–742.

O'Gorman, Lawrence, "Image and Document Processing Techniques for the RightPages Electronic Library System," IEEE ICPR, 1992, pp. 260–263.

Unser et al., "Enlargement or Reduction of Digital Images with Minimum Loss of Information," IEEE Transactions on Image Processing, vol. 4, No. 3, Mar. 1995, pp. 247–258.

Handley et al., "Optimal Nonlinear Fax Restoration," Document Recognition Spie vol. 2181 1994, pp. 232–242.

Naiman et al., "Rectangular Convolution for Fast Filtering of Characters," Computer Graphics, vol. 21, No. 4, Jul. 1987 pp. 233–242.

*Primary Examiner*—Dennis-Doon Chow
*Assistant Examiner*—Amr Awad
*Attorney, Agent, or Firm*—Blakely, Sokoloff, Taylor & Zafman LLP

[57] ABSTRACT

A method of generating an output image having a lower resolution than that of a source image is provided. A thinned image is generated by discarding outer pixels of the source image. In parallel with generation of the thinned image, an averaged image is generated, such that each pixel of the averaged image represents an average of a subset of pixels in the source image. A first output image is then generated by subsampling the pixels of the thinned image. A final output image is generated as a function of both the first output image and the averaged image.

20 Claims, 13 Drawing Sheets

| $b_7$ | $b_6$ | $b_5$ | $b_4$ | $b_3$ | $b_2$ | $b_1$ | $b_0$ | Gray-scale Value G (0≤G≤1) |
|---|---|---|---|---|---|---|---|---|
| 0 | 0 | 0 | 0 | 0 | 0 | 0 | 0 | 0.0 |
| ⋮ | ⋮ | ⋮ | ⋮ | ⋮ | ⋮ | ⋮ | ⋮ | ⋮ |
| 1 | 0 | 0 | 1 | 0 | 1 | 1 | 0 | 0.5 |
| ⋮ | ⋮ | ⋮ | ⋮ | ⋮ | ⋮ | ⋮ | ⋮ | ⋮ |
| 1 | 1 | 1 | 1 | 1 | 1 | 1 | 1 | 1.0 |

RESOLUTION REDUCTION TECHNIQUE FOR DISPLAYING DOCUMENTS ON A MONITOR

FIELD OF THE INVENTION

The present invention pertains to the field of image processing. More particularly, the present invention relates to the display of facsimile documents on computer display devices.

BACKGROUND OF THE INVENTION

As a result of technological advances such as the fax-modem, it has become common to send and receive facsimile ("fax") documents with personal computers rather than with dedicated fax machines. The use of computers to communicate and display faxed documents has many advantages over the use of dedicated fax machines, such as facilitating the editing of faxed documents. However, the quality of text tends to degrade when a faxed document is displayed on a computer monitor. This degradation occurs primarily because the spatial resolution of most computer monitors is much lower than that of most printed faxes. Current printed fax technology can provide a resolution of 1728 pixels by 2376 pixels for A4 size paper. In contrast, currently available high-quality computer monitors generally cannot provide a resolution greater than about 1280 by 1000 pixels, and some less expensive computer monitors cannot provide a resolution greater than 640 by 480 pixels. A similar loss in quality also tends to occur when a scanned document is displayed on a computer monitor, for essentially the same reason. One common result of some resolution reduction methods is that text appears to be out of focus, or "washed out".

A good method of displaying text images at low resolution is essential to any software package designed to display scanned or faxed images on a monitor. One way to produce more readable documents on screen is to utilize optical character recognition (OCR) products to reproduce text on screen. For many reasons, however, it may be desirable to avoid performing OCR. It is therefore desirable to perform resolution reduction on scanned or faxed documents for display on a computer monitor in a manner that reduces or eliminates degradation in image quality, particularly with respect to text images.

For purposes of editing a scanned or faxed document, it may be desirable to view the entire document on the monitor at one time. A person who is editing the layout of a page for publication, for example, may need to view the entire page at once in order to work efficiently. One problem associated with existing display software, however, is that due to the change in resolution, the entire document generally cannot be displayed on the monitor at once while still maintaining adequate readability. While portions of a displayed page can be magnified to provide greater readability, the remaining portions of the page are generally hidden from view. Although the page can be reduced in size in order to fit the page to the screen, the text often becomes too small to read. Consequently, a person editing the document may be required to scroll up and down the displayed document repeatedly, which can be annoying and time consuming.

Hence, it would be desirable to have a technique for improving the quality of display on a computer monitor of scanned or faxed documents. In particular, it would be desirable to have a technique for increasing the readability of text in scanned or faxed documents when displayed on a monitor, and for facilitating the editing of such documents.

SUMMARY OF THE INVENTION

One aspect of the present invention is a method of generating an output image from a source image, such that the output image has a lower resolution than that of the source image. In the method, a first process is performed on the source image to generate a first image, which has a resolution lower than that of the source image. A second process is performed on the source image in parallel with the first process to generate a second image, which also has a resolution lower than that of the source image. The output image is then generated as a function of the first image and the second image.

In another aspect of the present invention, a first image is provided at a first resolution and a second image is provided at a second resolution, which is different from the first resolution. A pattern is identified in the source image, and a value is assigned to a subset of the output image based on a relationship between the first image and the second image with respect to the pattern.

In yet another aspect of the present invention, blank space is removed from an input page that includes a plurality of images, by representing the images as a plurality of objects, and then locating each of the objects on an output page, such that the spacing between the objects in the output page is smaller than the spacing of the objects in the input page.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
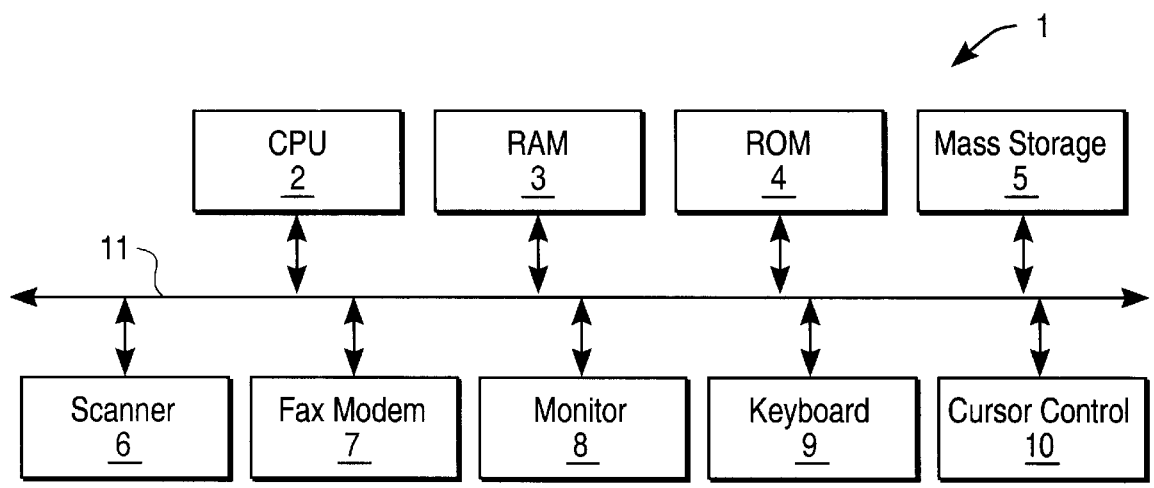
FIG. 1 is a block diagram of a computer system in which the present invention is implemented.

A method of displaying a low-resolution gray-scale image on a computer monitor based on a high-resolution binary image is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The displaying of a faxed or scanned document on a computer monitor generally requires a reduction in the spatial resolution of the document. Many resolution reduction techniques have certain disadvantages, however, which cause a degradation in the quality of text when displayed on a computer monitor. As will be described below, the present invention includes techniques for performing resolution reduction, which provide improved quality of displayed text in comparison to the prior art. In particular, the reduction in spatial resolution is partially mitigated by the increased gray-scale resolution provided by a computer monitor. The present invention also includes techniques for facilitating the editing of scanned or faxed documents when displayed on a computer monitor.

In one embodiment, the present invention is carried out in a computer system in response to its central processing unit (CPU) executing sequences of instructions contained in a memory, which may be random access memory (RAM). That is, execution of the sequences of instructions contained in memory causes the CPU to perform the steps of the present invention, which will be described below. The instructions may be loaded into memory from a persistent store, such as a mass storage device, and/or from one or more other computer systems (collectively referred to as a "host computer system") over a network, such as the Internet. For example, a host computer system may transmit a sequence of instructions to a target computer system in response to a message transmitted to the host computer system over a network by the target computer system. As the target computer system receives the instructions via a network connection, such as a fax modem, the computer system stores the instructions in memory. The computer system may store the instructions for later execution or execute the instructions as they arrive over the network connection.

In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU.

In alternative embodiments, hardwired circuitry may be used in place of, or in combination with, software instructions to implement the present invention. Thus, the present invention is not limited to any specific combination of hardware circuitry and software, nor to any particular source for the instructions executed by a computer system.

FIG. 1 illustrates a computer system 1 in which the present invention is implemented. Note, however, that the present invention is not limited to implementation in the specific architecture shown in FIG. 1. The computer system 1 includes a CPU 2, RAM 3, read only memory (ROM) 4, a mass storage device 5, a scanner 6, a fax modem 7, a monitor 8, a keyboard 9 and a cursor control device 10. These components are coupled together by a bus 11. Bus 11 may actually comprise two or more buses coupled by bridges and/or bus adapters. Mass storage device 5 may include a magnetic or optical storage device, such as a magnetic disk, CD-ROM, Digital Versatile Disk (DVD), or any other form of non-volatile storage device. Scanner 6 is used to generate high-resolution, digital (binary) representations of input (scanned) physical documents. Fax modem 7 is used to send and receive facsimile transmissions via telephone lines. Cursor control device 10 include a mouse, trackball, or any other device for allowing a user to manipulate images displayed via a graphical user interface.

Figure 2:
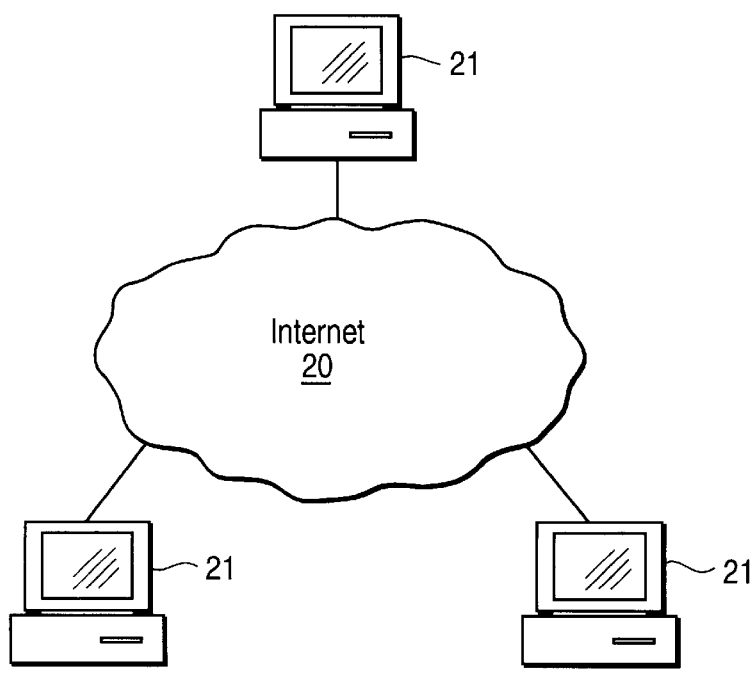
FIG. 2 illustrates a network configuration including computers in which the present invention is implemented.

For purposes of practicing the present invention, the computer system 1 may be part of a network configuration, such as that illustrated in FIG. 2. In the configuration of FIG. 2, several computers 21 are interconnected by the Internet 20. The present invention may be implemented in one or more of the computer systems 21, each of which may have an architecture similar to that of computer system 1 in FIG. 1. In one embodiment, at least one of the computer systems 21 functions as a network server, while the other or others function as clients, as will be described below.

Figure 3:
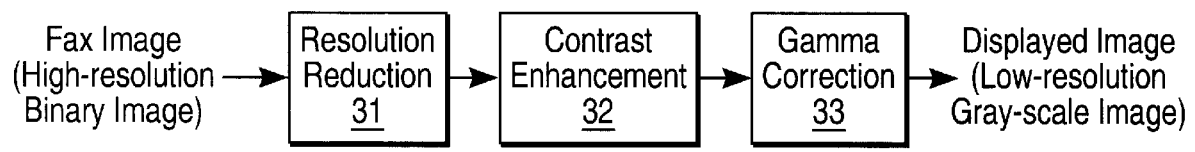
FIG. 3 is a flow diagram illustrating a routine for processing a high-resolution binary image for display on a monitor as a low-resolution gray-scale image.

An image input to the computer system 1 via scanner 6 or fax modem 7 can be displayed on the monitor 8. Such an image is generally input to the computer system as a high-resolution, digital (binary) image. In one embodiment of the present invention, a high-resolution binary image is operated upon in a three-part process to convert the image into a low-resolution, gray-scale image that is suitable for display on the monitor 8. This process is illustrated in FIG. 3.

Initially, a resolution reduction process 31 is used to convert the high-resolution image to a low-resolution image compatible with the monitor 8. Various embodiments of the resolution reduction process 31 are described below. Next, a contrast enhancement process 32 is optionally performed in order to provide a more readable document when displayed on the monitor. This process 32 can be performed in response to a user's input indicating his preference. A gamma correction process 33 is performed upon the resulting image to generate a final image for display on the computer monitor. Gamma correction is the correction for the nonlinearity between the input voltage and corresponding output luminance of a pixel on a monitor. This process is required for most computer monitors. Methods of performing contrast enhancement and gamma correction are well known in the art.

Resolution Reduction

Figure 4A:
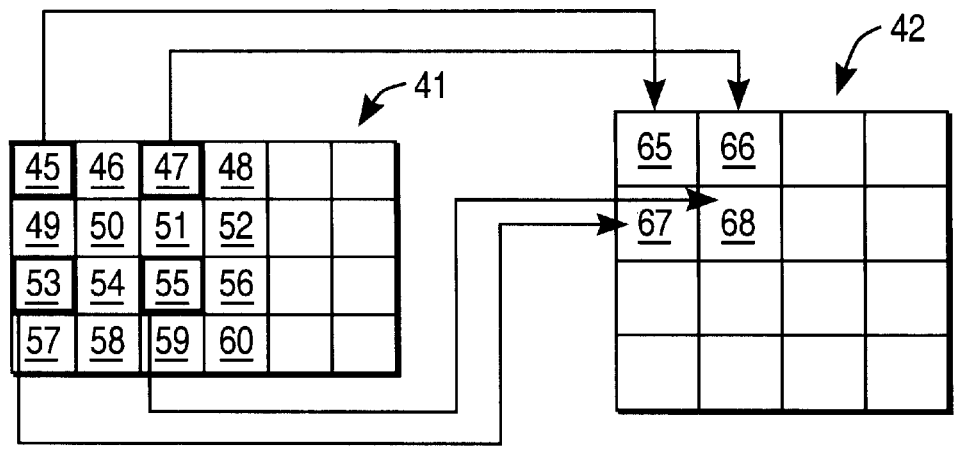
FIGS. 4A through 4C illustrate resolution reduction techniques.

One aspect of the present invention relates to the resolution reduction process 31. Various methods of resolution reduction are possible for displaying a digitized document on a computer monitor. FIG. 4A illustrates an example of one such method, which is known as "subsampling". In particular, FIG. 4A illustrates subsampling being used to generate a low-resolution image 42 from a high-resolution image 41. The high-resolution image 41 includes pixels 45 through 60. The low-resolution image 42 includes pixels 65 through 68. Each pixel in the low-resolution image 42 is generated based on the value of one particular pixel in the high-resolution image 41. Consequently, not all of the pixels in the high-resolution image 41 are used to generate pixels in the low-resolution image 42. In the example of FIG. 4A, one of every four pixels in the high-resolution image 41 is used to generate a pixel in the output low-resolution image 42. In particular, pixel 65 of image 42 is assigned a value based on pixel 45 in image 41; similarly, pixel 66 is assigned a value based on pixel 47 in image 41; pixel 67 is assigned a value based on pixel 53 in image 41; and pixel 68 is assigned a value based on pixel 55 in image 41.

Figure 4B:
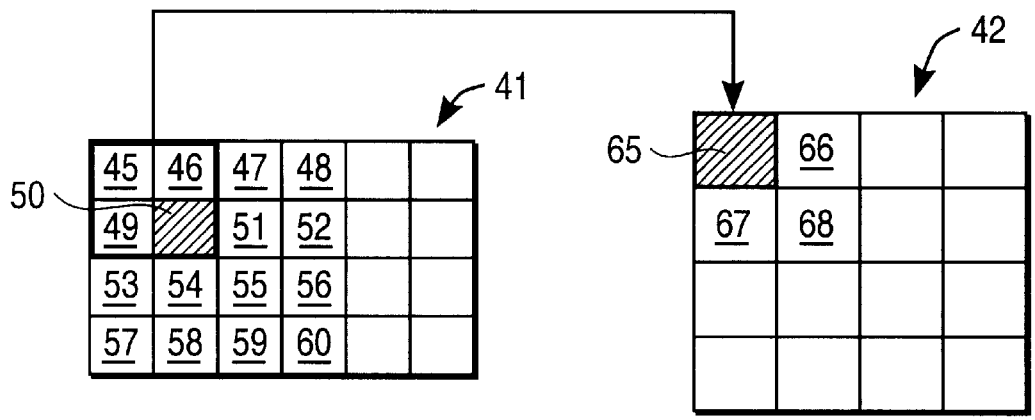

A second form of subsampling is illustrated in FIG. 4B, in which a given output pixel is made black (i.e., assigned an intensity level of zero) if, and only if, one or more pixels within a predefined "window" (area of interest) in the high-resolution image are black. A different window is used to generate each pixel in the low-resolution image 42, although the windows may overlap. Thus, in FIG. 4B the predefined window in the high-resolution image 41 currently includes pixels 45, 46, 49 and 50. If any of these pixels is black, then pixel 65 of the low-resolution image is made black. Hence, pixel 65 in image 42 is black, since pixel 50 in image 41 is black.

Figure 4C:
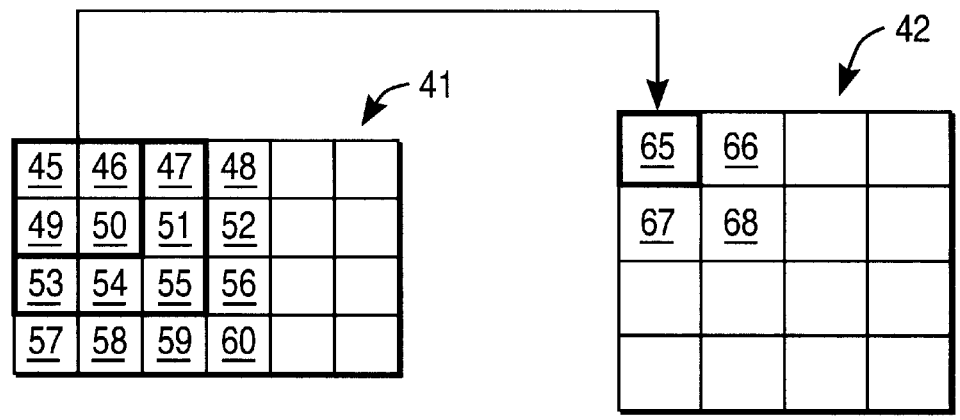

Another method of resolution reduction is known as "averaging". One form of averaging is depicted in FIG. 4C. With the averaging technique, the intensity of a each pixel in the low-resolution image is computed as the average of the intensities of the pixels located within a predefined window on the high-resolution image. Referring to FIG. 4C, pixel 65 of image 42 may be taken to be the average of pixels 45, 46, 49 and 50 in high-resolution image 41. The size of the window used in the high-resolution image may be dependent upon the resolution reduction factor. For reduction by a factor of two, for example, a window of 2 by 2 pixels can be used. Various different window sizes including fractional pixel averages can be used for resolution reduction by a different amount.

The resolution reduction techniques described above have certain disadvantages. For example, subsampling tends to cause aliasing, in which a given frequency of intensity variations in the high resolution image is misrepresented as another frequency in the low resolution image. For example, a thin stripe (e.g., one or two pixels in width) in the high resolution image might be represented in the low resolution image as all black or all white or as a very thick stripe. Averaging is an acceptable technique for continuous tone images. However, when applied to text images, averaging tends to cause blurring of the sharp edges of text, depending upon the size of the window used. This effect may manifest itself as, for example, the loss of the "hole" in the letter "A"). The present invention avoids such loss in quality. In particular, the reduction in spatial resolution is partially mitigated by the increased gray-scale resolution provided by a computer monitor.

Figure 5:
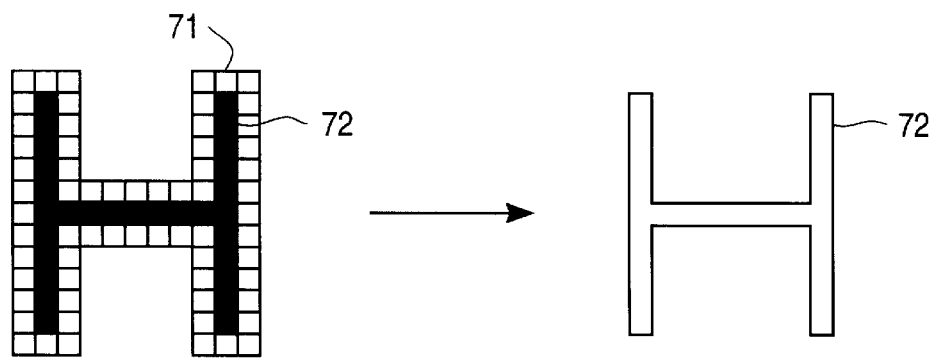
FIG. 5 illustrates the effects of thinning on a text character.
Figure 6:
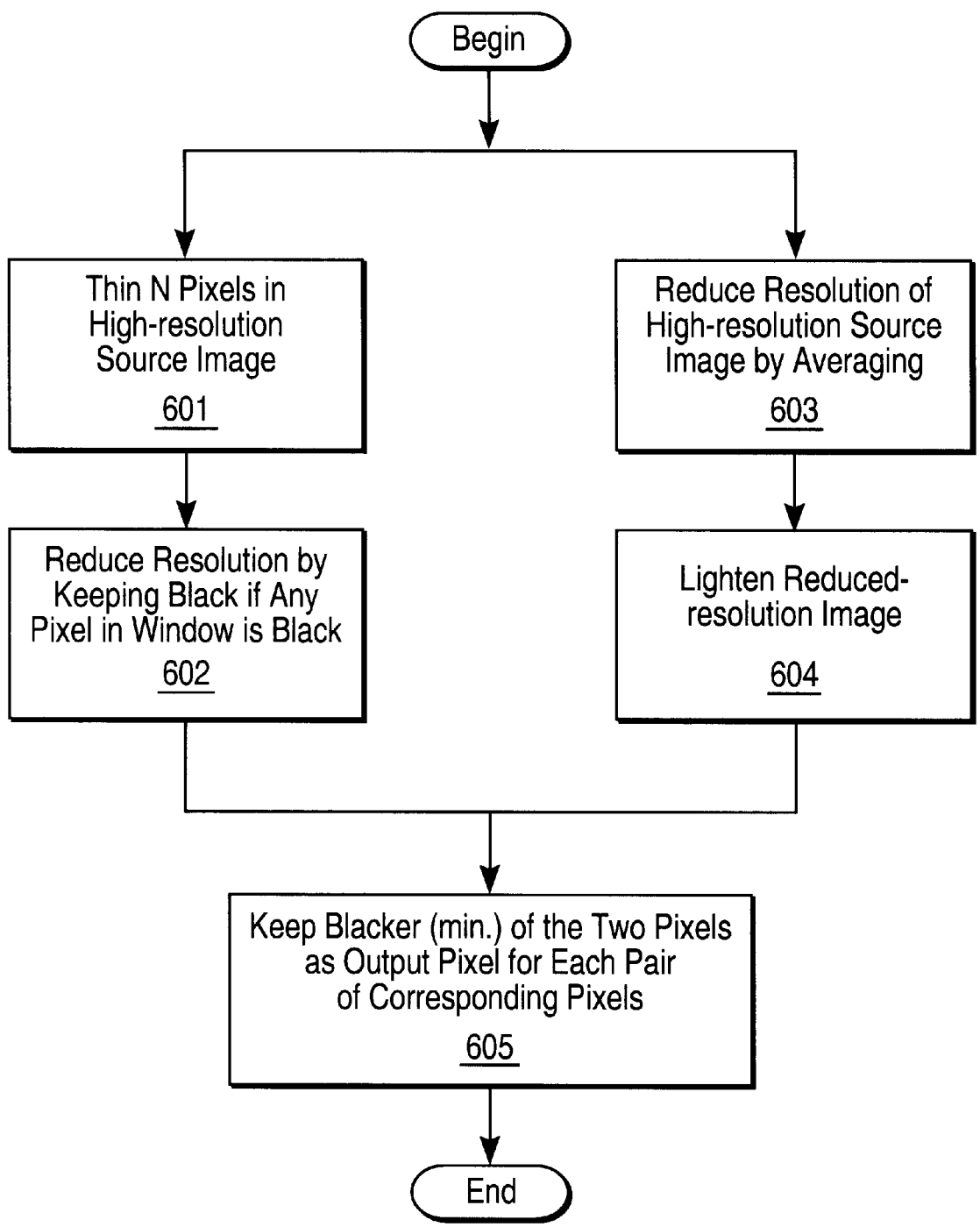
FIG. 6 is a flow diagram illustrating a routine for performing resolution reduction according to the present invention.

FIG. 6 illustrates a resolution reduction technique according to the present invention, which produces high quality text images. Two processes are performed in parallel on a high-resolution, binary source image. Each process generates an intermediate output image which is used to generate the final output image for display on the monitor. The first process consists of steps 601 and 602. In step 601, the source image is thinned by a predetermined number of pixels N. The process of thinning is illustrated in FIG. 5.

Thinning consists of peeling a layer of one or more pixels off the periphery of a given character of text. Thinning is performed so that all connected components of a character (e.g., the horizontal segment of the letter "A" or the letter "H") are maintained. In FIG. 5, the source image 71 consists of the character "H". During thinning, the outermost layer of pixels is peeled off so that the resulting image 72 consists of only the pixels designated by area 72 in source image 71. In one embodiment, a one-pixel layer is peeled off of each character, and this process is then repeated a number of times according to the resolution reduction factor. For example, for a resolution reduction by a factor of 2, the process of peeling a one-pixel layer off is applied twice for a given text image.

After the source image is thinned in step 601, the resolution of the source image is reduced in step 602 using the subsampling method described in connection with FIG. 4B. That is, a given pixel in the low-resolution image is made black if any pixel within a predetermined window in the high-resolution image is black. This can be implemented using a simple averaging technique followed by a threshold operation to make all gray pixels (generated as a result of the averaging technique) black.

Steps 603 and 604 are performed in parallel with steps 601 and 602. In step 603, the resolution of the source image is reduced using averaging, as described in connection with FIG. 4C. A relatively large window is used in order to cause smoothing of text (i.e., transformation of distinct black-white edges into gradual transitions between back and white). Next, in step 604 each pixel in the resulting low-resolution image is lightened by a predetermined amount. The lightening step 604 is performed because the black contours will be provided by the thinned image and the lightened image will presumably be darkened by the contrast enhancement process 32 (see FIG. 3).

As noted, the two parallel processes described above generate two intermediate output images having the same resolution—a thinned and subsampled image from steps 601 and 602 and a averaged image from steps 603 and 604. The two intermediate output images are combined in step 605 to form the final output image. In step 605, the blacker of the corresponding pixels in the two intermediate output images at each location is retained as the output pixel for that location in the final low-resolution output image. The result of the routine of FIG. 6 is an image which tends to have completely black contours as a result of the thinning operation, but with gentle borders, instead of the blotchy appearance that thinning alone might produce.

Figures 7A, 7B:
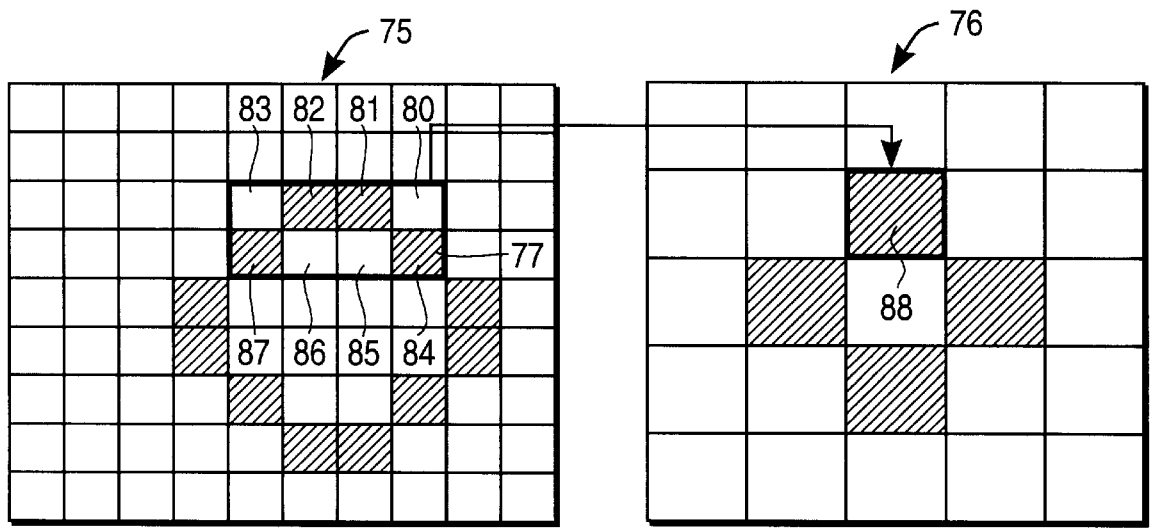
FIG. 7A illustrates a relationship between two identical images rendered at different resolutions.
FIG. 7B illustrates a table representing a template of gray-scale values.

FIGS. 7A and 7B illustrate a second technique for performing resolution reduction while maintaining the quality of text images. As will be described in detail below, a pixel "template" is first generated based on images that have been rendered well at low-resolution, and the template is subsequently used to perform resolution reduction.

In one embodiment of the template method, a number of text files are generated using Postscript (a page description language available from Adobe Systems of San Jose, Calif.) at typical fax resolution. The same text files are also generated with Postscript at a typical monitor resolution. The text files contain a sufficient variety of text (preferably including a number of different fonts) to provide a statistically significant sample of different pixel patterns. A resolution of 200 dots per inch (dpi) may be used to represent the typical fax resolution, while 100 dpi may be used to represent a typical monitor resolution. A window of predefined size is then progressively moved over each high resolution (e.g., 200 dpi) Postscript file in its entirety. For each combination of pixel values that is observed within that window, the value of the corresponding pixel in the corresponding lower resolution (e.g., 100 dpi) Postscript file is recorded. For each combination of pixels that is observed in the predefined window, the expected (average) value of the corresponding pixel in the lower-resolution Postscript file is then computed. The (low-resolution) expected value is then stored in a table with the corresponding (high-resolution) pixel combination.

The expected values stored in the table represent ideal gray-scale values for each combination of pixels observed in the high-resolution image. This table is then used during the actual resolution reduction process by looking up each combination of input pixels and then using the corresponding expected value as the gray-scale value for the low-resolution output pixel. Hence, the table represents a template for performing resolution reduction. Note that the low-resolution (100 dpi) Postscript image, which is intended to simulate a monitor image, is actually a black-and-white (binary) image rather than a gray-scale image; however, the expected values of pixels stored in the table will tend to fall somewhere between black and white intensities and can therefore be used as gray-scale values.

The above-described template technique is now further described with reference to FIG. 7A. A first image 75 is generated using Postscript at 200 dpi, and a second image 76 is generated using Postscript at 100 dpi. Images 75 and 76 are both binary images. A window 77 is progressively moved across image 75. In one embodiment, the window 77 is a two-by-four pixel window. As a result, overlap occurs between consecutive positions of the window 77 as it is moved across the image 75. Such overlap is desirable, however, because it provides an opportunity to gather information on not only the pixel of interest, but also for some of the area surrounding the pixel of interest.

FIG. 7A shows a point in time when window 77 includes pixels 80 through 87. Pixel 88 in the 200 dpi image 76 corresponds to pixels 80 through 87 in the 100 dpi image 75. Accordingly, when window 77 reaches the position shown, both the pattern of pixels appearing in window 77 and the value of pixel 88 in the 100 dpi image 76 are recorded. The pattern of pixels is recorded as a binary sequence, in which the value of each pixel is represented by a different bit. Thus, pixels 80 through 87 in image 75 may be represented by the bit pattern "10010110", where the rightmost bit represents pixel 80 and the leftmost bit represents pixel 87. The window 77 is moved over the entire 200 dpi image, and the expected value for a particular pattern is updated each time that pattern appears again in the window. This process is used to generate a table such as that illustrated in FIG. 7B.

In one column of the table, each combination of input pixels observed in the window over the 200 dpi image 75 is stored. In the second column, the expected value of the pixel in the low-resolution image 76 is stored for each combination in the first column. Each such expected value represents the best gray-scale value so far for the corresponding pattern of pixels. For example, assume that the bit pattern "10010110" corresponds to a black pixel in the low resolution image 50 percent of the time and corresponds to a white pixel the other 50 percent of the time. The expected value of the bit pattern "10010110" in that case would be 0.5 (normalized), such that the gray scale value assigned to that bit pattern would be 0.5 (normalized). Note that the particular numerical values stated here are used for purposes of illustration only. Thus, to perform resolution reduction, table look-ups are performed in order to generate low-resolution gray-scale pixels from high-resolution binary pixels. As many images as possible should be used to generate the table values, as noted above.

Figure 8:
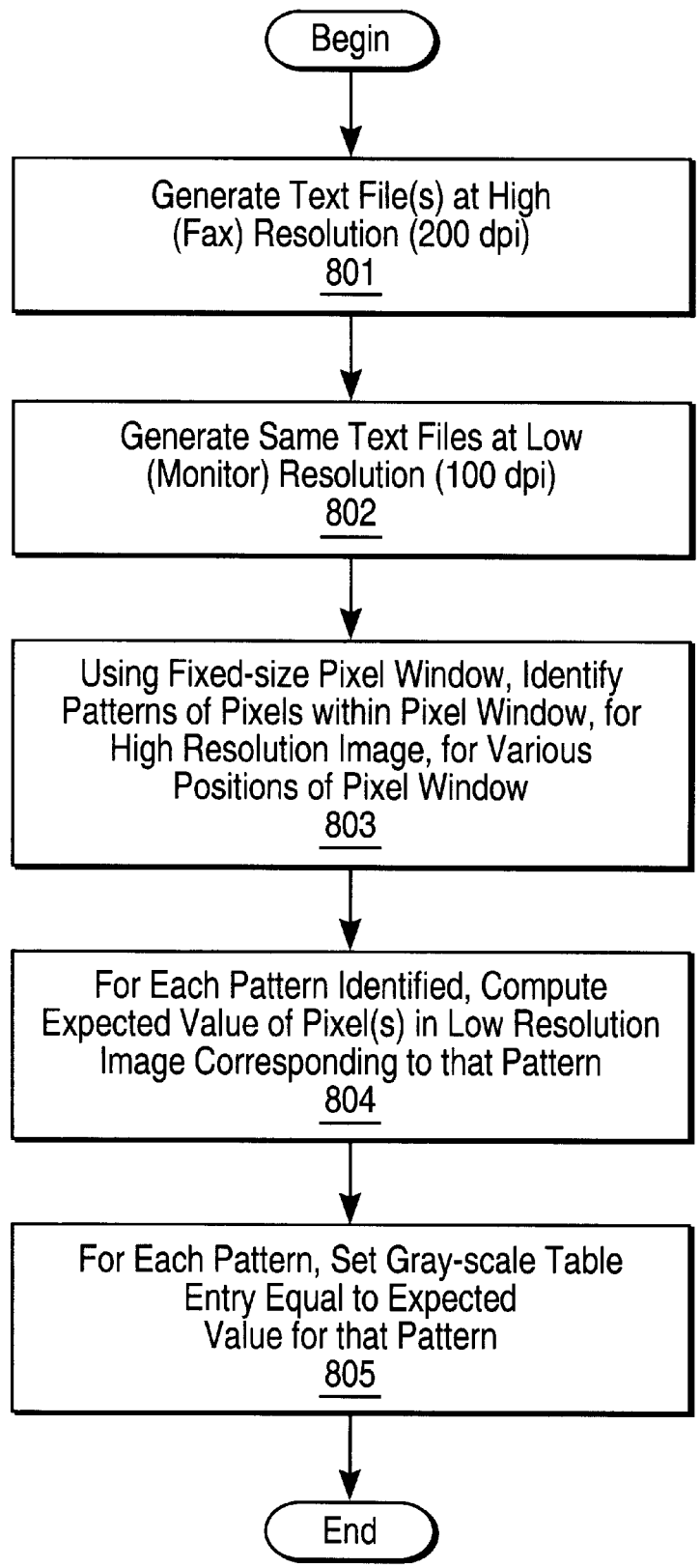
FIG. 8 is a flow diagram illustrating a routine for generating a table representing a template of gray-scale values.

FIG. 8 illustrates a routine for generating a table such as the one just described. In step 801, one or more text files are generated using a page description language, such as Postscript, at a relatively high-resolution, such as 200 dpi. In step 802, the same text files are generated using the page description language at relatively low-resolution, such as 100 dpi. In step 803, using a fixed size pixel window, the patterns of pixels appearing within the window are identified at a number of different window positions for the high-resolution image. In step 804, for each pattern identified in step 803, the expected (average) value of the corresponding pixel in the low-resolution image is identified. In step 805, for each pattern identified, the corresponding gray-scale value is set equal to the expected value for that pattern and is stored in the table.

Figure 9:
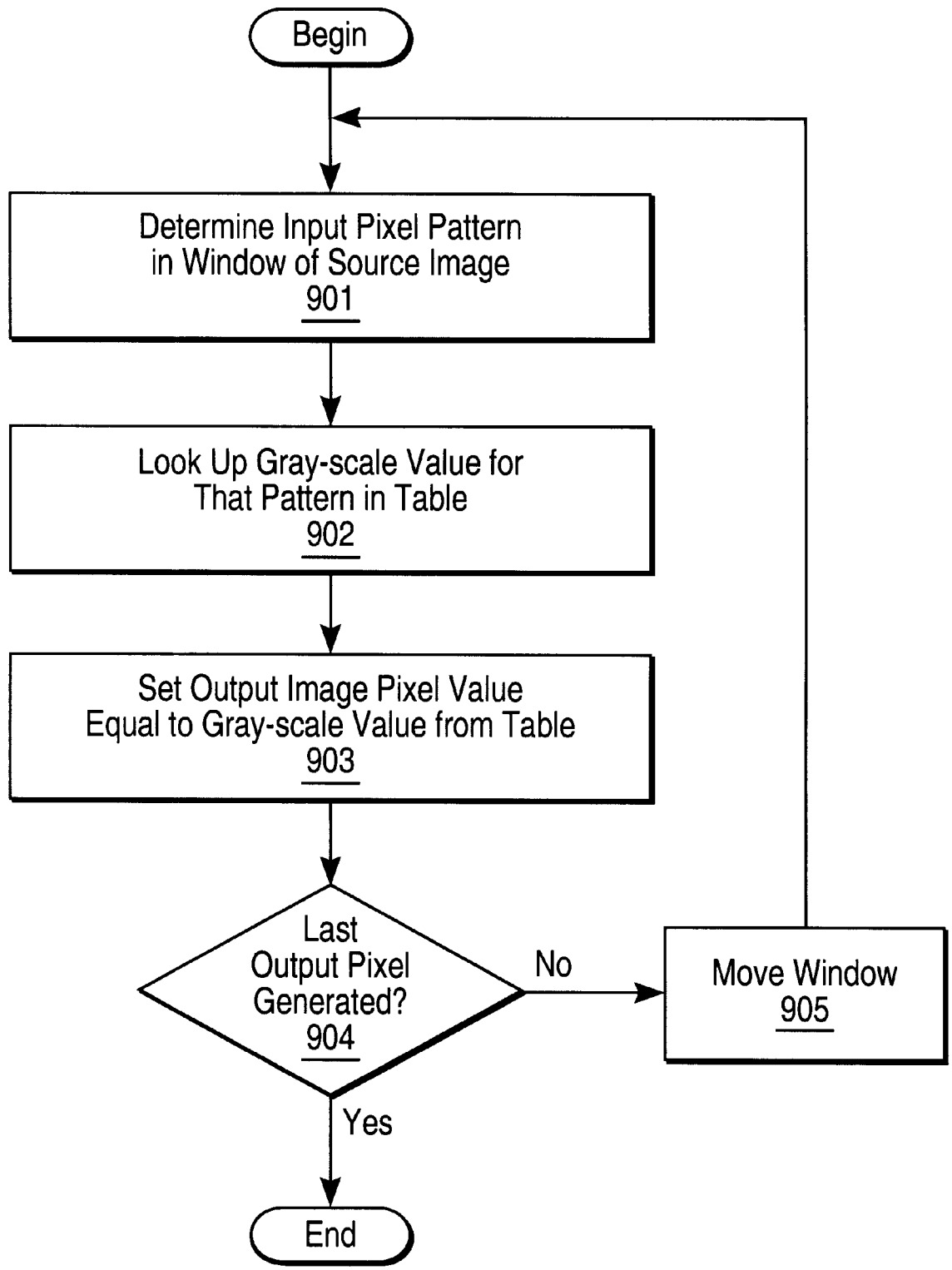
FIG. 9 is a flow diagram illustrating a routine for using a template to generate a low-resolution gray-scale image from a high-resolution binary image.

FIG. 9 illustrates a routine for using the table to perform resolution reduction of an input image. In step 901, the pattern of pixels appearing in a window over the input (high-resolution) image is identified. The window has the same dimensions as the window which was used to generate the lookup table. In step 902, a gray-scale value for that pattern is then looked up in the table. In step 903 the value of the output pixel of the low-resolution image is set equal to the gray-scale value obtained from the table. If the last output pixel has not yet been generated (step 904), then the window is moved in step 905 to a new location over the input image in order to generate the next output pixel.

Another aspect of the present invention includes techniques for facilitating the editing of scanned or faxed documents. One of the disadvantages of reducing the resolution of a scanned or faxed document for display on a monitor is that the image generally cannot be entirely displayed on the monitor at one time while maintaining readability. With existing technology, certain portions of the document can be enlarged on the screen to provide greater readability. However, the remaining portions of the page are generally hidden from view. The present invention includes techniques which overcome these disadvantages. One such technique is a method of performing variable resolution reduction, which will now be described.

Variable Resolution Reduction

Generally, the lower resolution of a monitor compared to a scanned or faxed document may result in a perceived magnification of the document when the document is displayed on the monitor. In the variable resolution reduction technique, different portions of a document are reduced in resolution by different amounts. As a result, only a portion of a page may appear to be magnified when displayed on a monitor, or different portions of the page may appear to be magnified by different amounts. In either case, the entire page can be maintained visible on the monitor.

Figure 10:
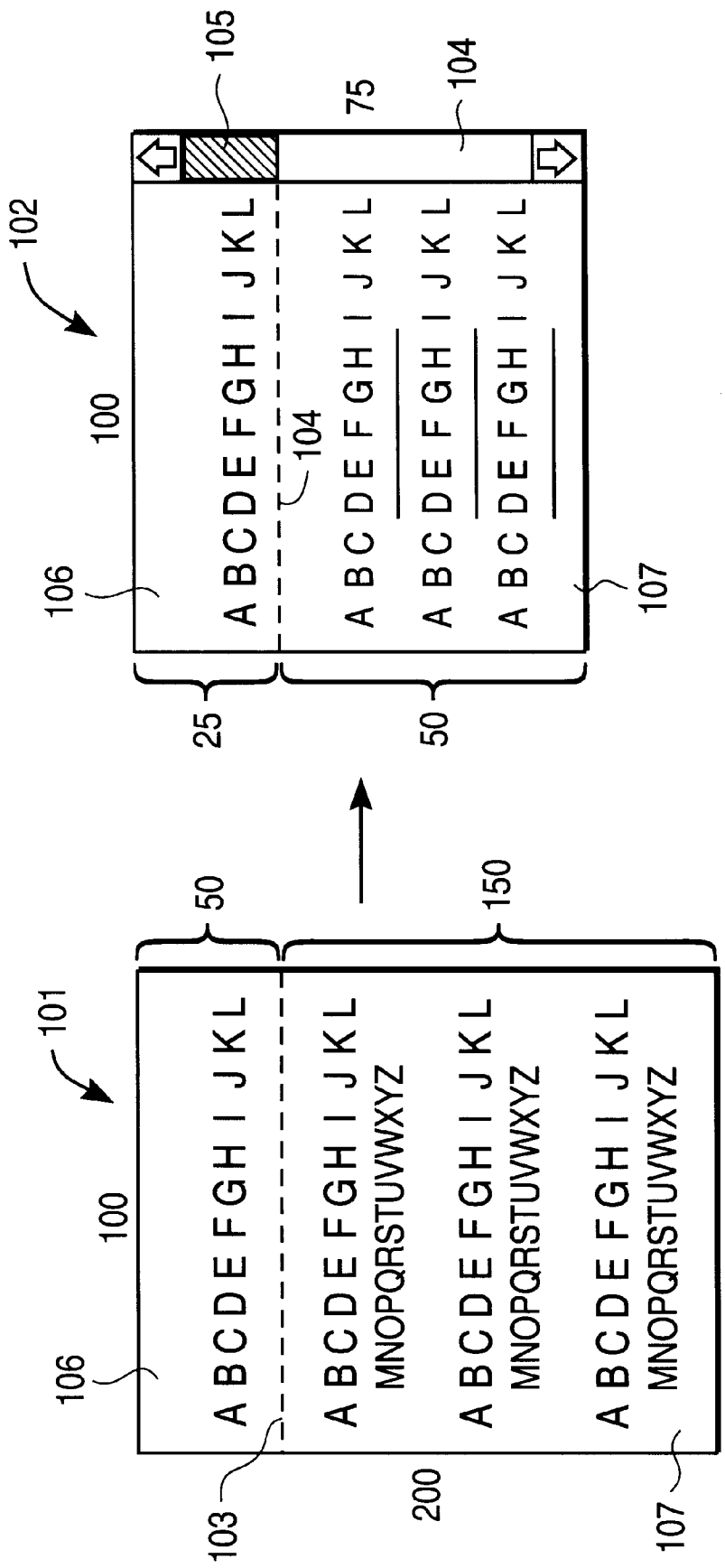
FIG. 10 illustrates the effect of variable resolution reduction on a document displayed on a monitor.

FIG. 10 shows a high-resolution 100 by 200 pixels binary image 101. Image 101 is a source image that is converted using the present invention to a 100 pixels by 75 pixels low-resolution image 102 for display on a monitor. The high-resolution image 101 is separated into two portions, a portion 106 located above line 103 and a portion 107 located below line 103. The portion above line 103 is the area of interest 106 which is to be magnified for readability. The area of interest 106 in this example has dimensions of 100 by 50 pixels, while the area 107 below line 103 has dimensions of 100 by 150 pixels. The area of interest 106 is magnified by a greater amount than the remainder of the document when displayed on the computer monitor. This is accomplished by applying a different resolution reduction factor to the area of interest 106 than the remaining portion 107 of the document. Accordingly, the area of interest 106 can be easily read by the user of the computer when the low resolution image 102 is displayed on a monitor while the entire document remains visible on the screen.

The area of interest 106 can be adjusted by the user to include different portions of the document through operation of a control in a graphical user interface. In one embodiment, the control is a scroll bar 104 displayed on the computer screen, as shown in FIG. 10. The user can move area 105 vertically within the scroll bar 104 using the cursor control device, in order to relocate the boundaries of the area of interest 106 vertically. Note that, although the magnification technique has been illustrated and described only with respect to the vertical direction, the same technique can also be applied to provide variable resolution reduction and magnification with respect to the horizontal direction.

Figure 11:
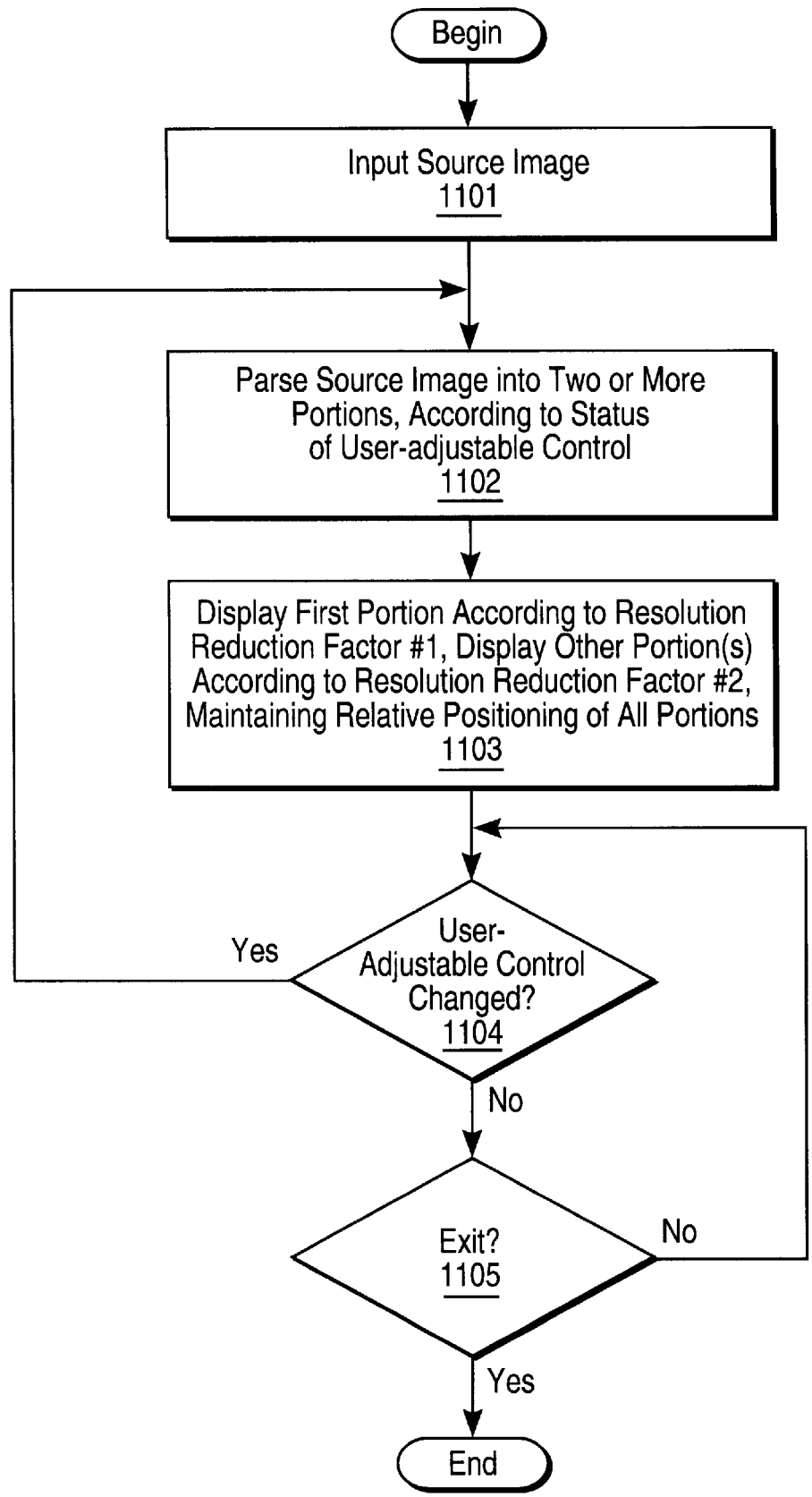
FIG. 11 is a flow diagram illustrating a routine for performing variable resolution reduction.

A routine for performing the variable resolution reduction technique is illustrated in FIG. 11. Initially, a high-resolution source image is input to the computer system (e.g., using a scanner or fax modem) in step 1101. The source image is then parsed into two or more portions, as determined by the status of a user-adjustable control (e.g., a scroll bar). Note that, although FIG. 10 illustrates an example in which the document is parsed into two portions 106 and 107, the document can be parsed into more than two portions, if desired. In step 1103, a first portion is displayed according to a first resolution reduction factor, while each other portion is displayed according to one or more different resolution reduction factors. The relative positioning of the portions is not altered. In step 1104, if the status of the user-adjustable control has been altered, the document is reparsed and redisplayed accordingly. The routine ends when an Exit command is received from the user in step 1105.

Blank Space Removal

Figure 12A:
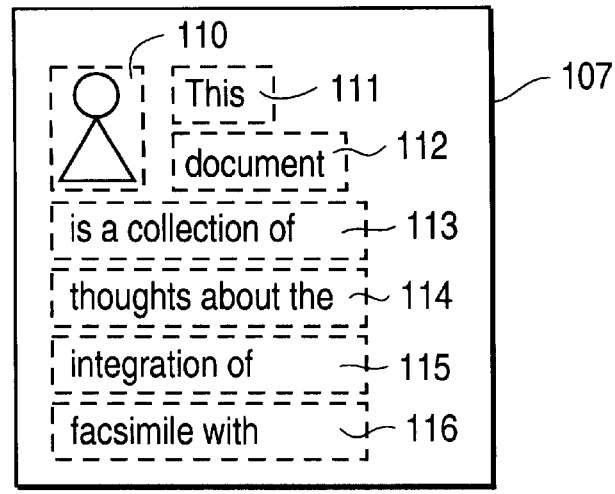
FIGS. 12A through 12C illustrate the removal of blank space from a document.

Another aspect of the present invention is a technique for removing blank space from documents. In order to reformat a faxed or scanned document for display on a computer monitor (or for other reasons), it might be advantageous to compress the information in the document into a smaller physical area. Referring now to FIG. 12A, a document 107 consists of a pictorial image 110 and several lines of text. In accordance with the present invention, the text in the document is characterized as a number of objects. In one embodiment, each line of text is represented as a rectangle. Methods of representing text as objects such as rectangles are well-known in the art and are described in U.S. Pat. Nos. 5,465,304 and 5,335,290, for example. After the lines of text are converted into rectangles, the blank space between the text is removed by appropriate repositioning of the rectangles on the output page that is to be displayed on the monitor.

Figure 12B:
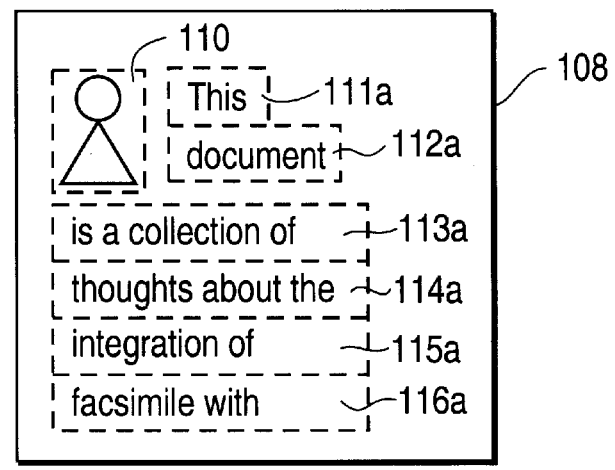
Figure 12C:
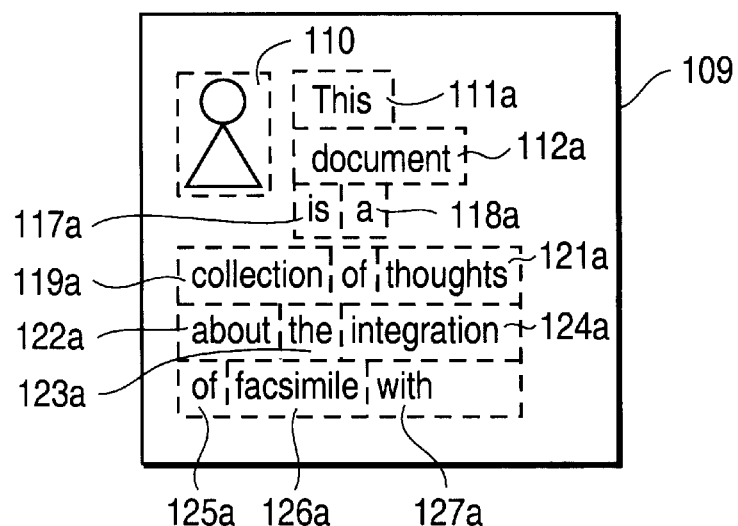

Conversion of the text into objects also allows the text to be reformatted on the document, as shown in FIG. 12C. In order to provide greater flexibility when reformatting, it may be desirable to represent individual words or phrases as rectangles as an alternative to representing entire lines of text as rectangles. In FIG. 12C, each of objects 111A through 127A represents a single word of text. The format of the text has been changed from that of FIGS. 12A and 12B.

Figure 13A:
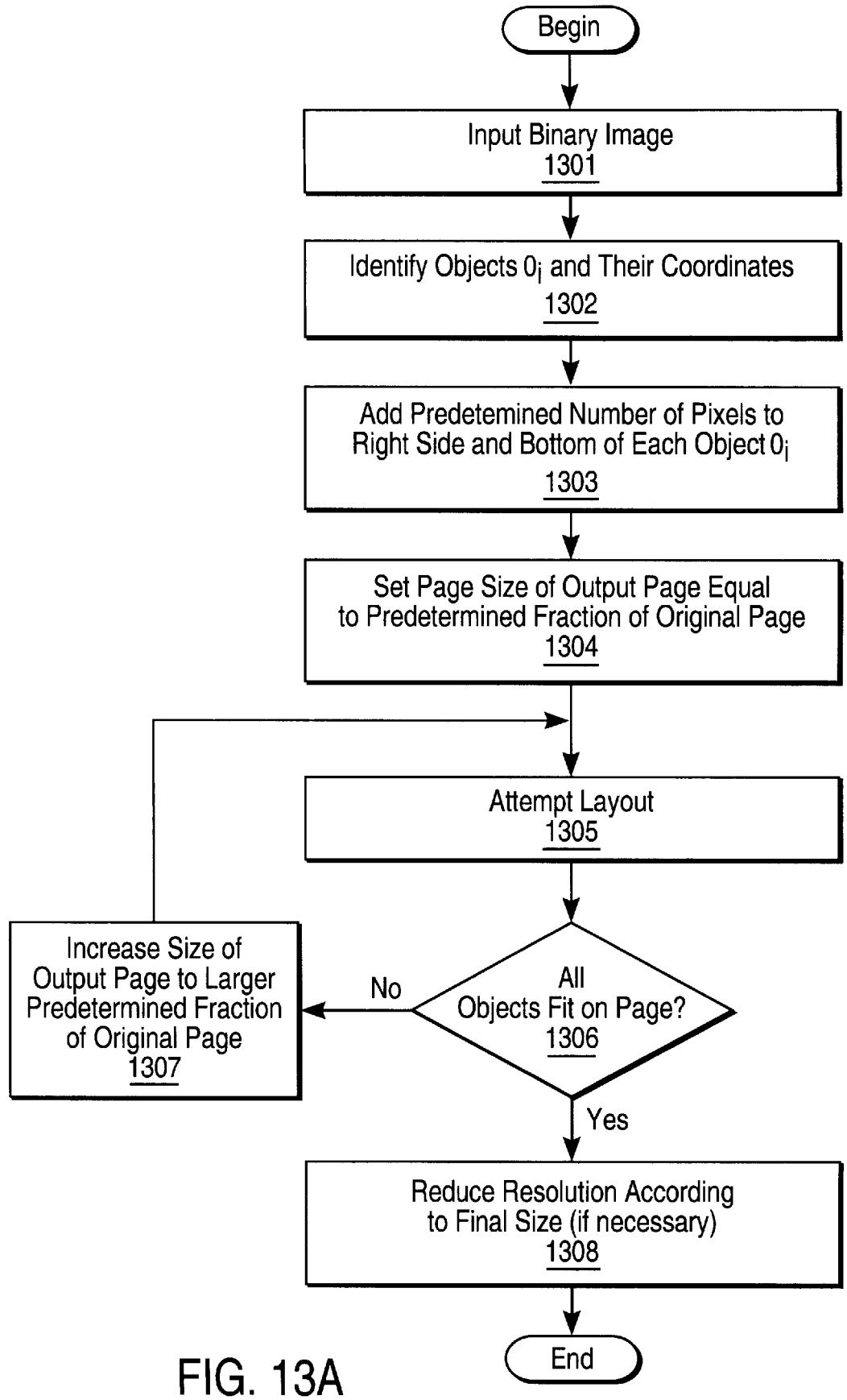
FIGS. 13A and 13B are flow diagrams illustrating routines for removing blank space from a document.

FIG. 13A illustrates a routine for removing blank space between lines of text. In step 1301, a binary image is input to the computer system via a fax modem or scanner. In step 1302, the text in the input image is converted into a number N of objects $O_i$, where i=1, 2 . . . N. The objects are assumed to be rectangles for purposes of this explanation. Also, in step 1302 the coordinates of each object $O_i$ on the page are identified. In step 1303, for each object $O_i$, a predetermined number of pixels is added to both the right side and the bottom of the object. This added layer of blank pixels represents the minimum acceptable spacing between portions of text for the final output image.

Figure 14:
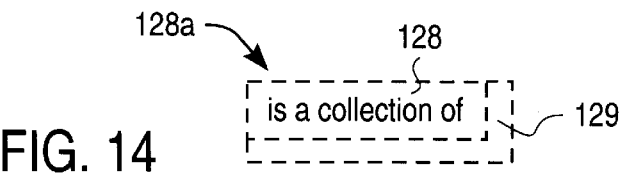
FIG. 14 illustrates the representation of a phrase of text as an object.

Step 1303 step is further illustrated in FIG. 14. In FIG. 14, the phrase "is a collection of" is initially represented as a rectangle 128. A layer of blank pixels 129 is then added to the bottom and right side of rectangle 128 to form a new rectangle 128A. Referring again to FIGS. 12A and 12B, the text of document 107 is represented as a number of rectangles 111 through 116 (FIG. 12A). After the blank layer of pixels is added to each rectangle, the text is represented by modified rectangles 111A through 116A, as shown in FIG. 12B.

After adding the layer of blank pixels to each rectangle, the size of the output page is set equal to a predetermined fraction of the original page in step 1304. For example, the size may initially be set to 50% in both the horizontal and vertical dimensions. Next, in step 1305 an attempt is made to position all of the objects on the output page. Step 1305 is described in greater detail below. If all of the objects $O_i$ fit on the page (step 1306), then resolution reduction is performed in step 1308. If all of the objects did not fit on the page, then in step 1307, the size of the output page is increased to a larger fraction of the original page (e.g., 50% horizontally, 75% vertically), and another attempt is made to position the objects is made in step 1305. Steps 1305 through 1307 are repeated until all of the objects are successfully located on the output page. In the best case, the final size of the final output page is equal to the initial predetermined fraction of the original page, and the only blank space between the text objects is the layer of pixels added in step 1303. In the worst case, the final output page has the same size as the input page, and the text is spaced the same as in the original document.

Figure 13B:
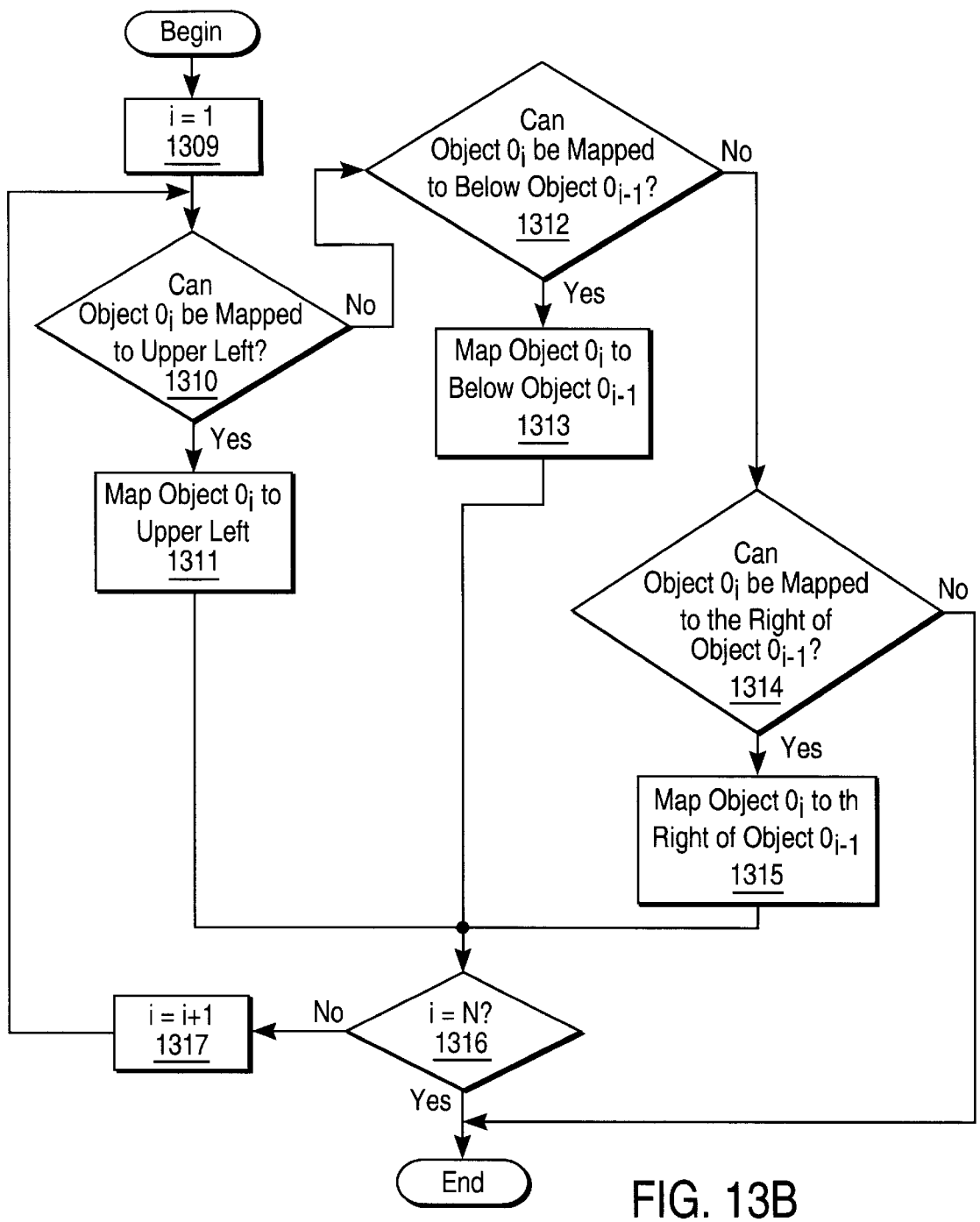

FIG. 13B illustrates in greater detail the step 1305 of positioning the objects $O_i$ on the output page. With i initially equal to 1 (step 1309), it is first determined in step 1310 whether object $O_i$ can be mapped to the upper-left position on the output page. If so, then object $O_i$ is mapped to the upper-left in step 1311. If not, then it is determined in step 1312 whether object $O_i$ can be mapped to a position just below object $O_{i-1}$. If object $O_i$ can be mapped to a position just below object $O_{i-1}$, then in step 1313, object $O_i$ is mapped to that position. If it is determined that object $O_i$ cannot be mapped to a position just below object $O_{i-1}$, then it is determined in step 1314 whether object $O_i$ can be mapped just to the right of object $O_{i-1}$. If so, then the object is mapped to that position in step 1315. If not, the routine ends. After performing either step 1311, 1313, or 1315, the index value i is increased in step 1317, and the steps above are repeated until all of the objects have been mapped to the output page.

The present invention also includes a technique by which a network connection can be utilized to determine user preferences relating to certain pre-display operations. In particular, this technique can be used to acquire user preferences relating to methods of resolution reduction, contrast enhancement, gamma correction, or virtually any operation or parameter setting.

In this technique, a computer is configured as a World Wide Web server. Other remote computers function as clients in accessing a Web site implemented by the server. In one embodiment, the server provides each of the remote computers with a series of text images to display. Each image consists of several lines of text. The images are identical in terms of content; however, each image is generated using a different variation of pre-display processing. For example, each image is generated using a different method of resolution reduction, contrast enhancement, gamma correction, a different combination of these operations, or different parameter settings in performing any of these operations. The user of the client system accessing the Web site is then given a series of prompts to identify which of the images he finds most readable. The response of each user are recorded by the server, processed, and used to identify the best methods of performing resolution reduction, contrast enhancement, gamma correction, or whatever operation or parameter is being considered. This method of acquiring user preferences is advantageous in that, while there is little or no control over the environment in which each user views the images, a very large data sample can be acquired easily in a relatively short period of time.

In one embodiment, four text images are initially displayed to each user of a client system. The user is then prompted to click on the highest quality image displayed using a mouse or other cursor control device. When the user selects an image, the selected image is removed from the display, and the user is prompted to select the best of the remaining images. This procedure is repeated until the images have been effectively ranked in order of the user's preference. After the user has ranked the images in this manner, all of the images are again displayed, and the user is prompted to designate which of the images he considers to be of acceptable quality.

Figure 15:
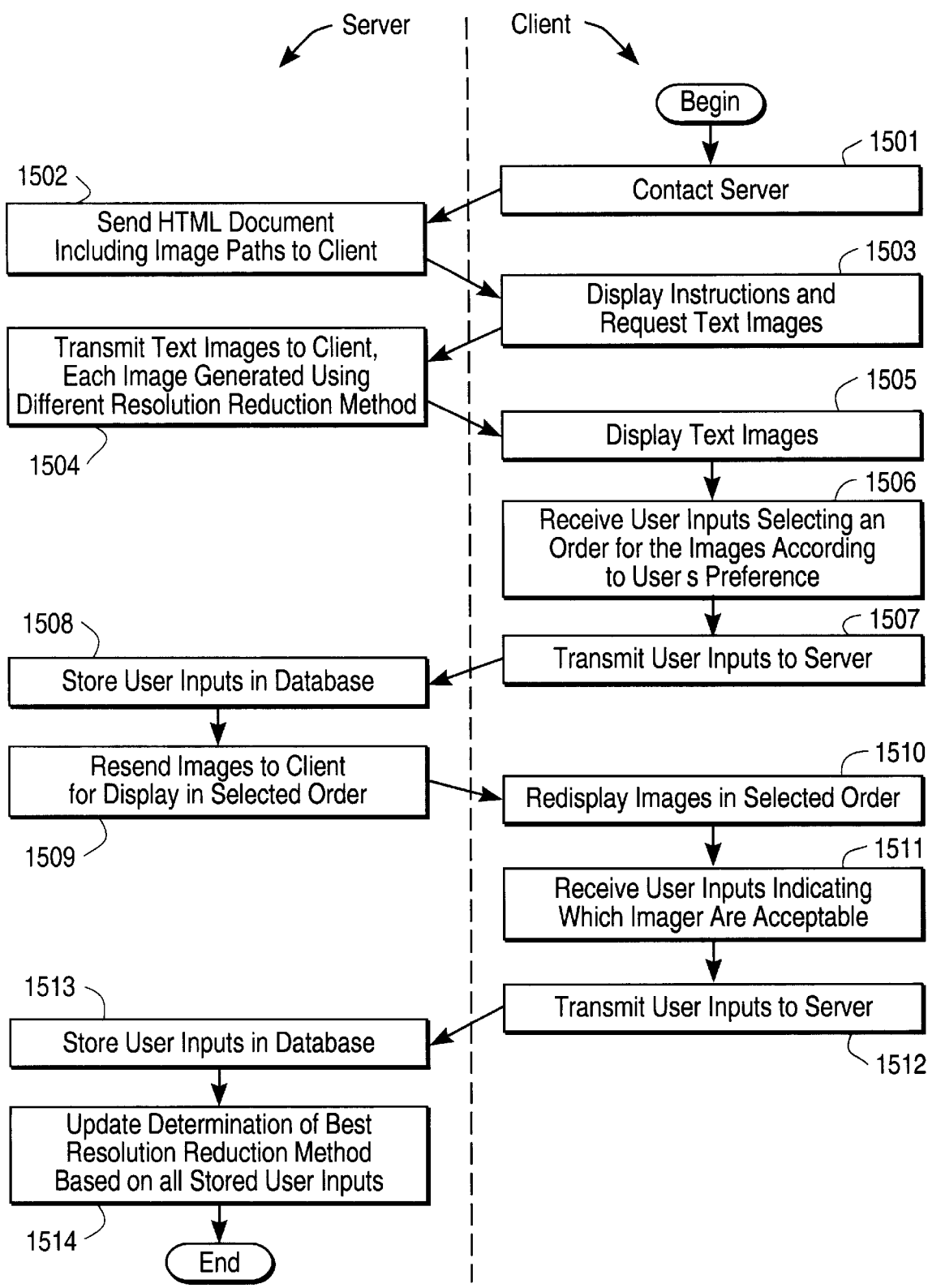
FIG. 15 is a flow diagram illustrating a routine for using a network to acquire user preferences and to select a method of resolution reduction.

FIG. 15 illustrates a routine for using the network to acquire user preferences. Initially, a client computer contacts the Web server in step 1501. In step 1502, the server transmits an HTML (Hyper-Text Mark-up Language) document to the client computer system. The HTML document includes image paths designating the locations of text images which will be displayed on the client system. In response to receiving the HTML document, the client system then displays the document on its monitor in step 1503. The document provides instructions which are displayed to the user and which will be used in conjunction with the text images that will subsequently be displayed. In addition, the client system requests the text images from the server using the image paths specified in the HTML document. In response, the server computer system transmits the images of text to the client in step 1504.

Each image transmitted to the client has been previously generated using a different variation of pre-display processing operations or set of parameters. For purposes of this explanation, it is assumed that each image in the routine of FIG. 15 is generated according to a different method resolution reduction. In step 1505, upon receiving the text images, the client system displays the text images on its monitor. The client computer system then waits to receive inputs from a user in step 1506 designating an order of preference for the displayed images. These inputs are then transmitted in step 1507 to the server. In step 1508, the server stores the inputs in a database. In step 1509, the server retransmits the images to the client for display in the order selected by the user (step 1510). In step 1511, the client computer system waits to receive inputs from the user indicating which of the displayed images the user finds acceptable. These user inputs are then transmitted to the server in step 1512. In response, the server system stores the inputs in a database in step 1513. These inputs are then used in step 1514, along with all previously acquired data, to determine a best resolution reduction method or to update a prior determination of the best resolution reduction method.

Thus, a method of displaying a low-resolution gray-scale image on a computer monitor based on a high-resolution binary image has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of generating an output image based on a source image, the source image having a plurality of binary pixels, the method comprising the steps of:

thinning the source image by peeling off outer pixels of the source image to produce a first image;

reducing the resolution of the first image to produce a second image;

performing windowed sampling of values of the pixels of the source image to produce a third image, such that the third image has a plurality of gray-scale pixels; and generating the output image based on the second image and the third image, such that the output image has a plurality of gray-scale pixels, and such that the output image has a resolution lower than that of the source image.

2. A method according to claim 1, wherein the step of performing windowed sampling comprises generating each pixel of the third image as an average of a plurality of pixels of a predefined region of the source image.

3. A method according to claim 1, wherein the step of reducing the resolution of the first image to produce the second image comprises subsampling the first image.

4. A method of enabling a target computer to generate an output image from a source image, the method comprising the step of transmitting sequences of instructions from a host computer to a target computer, the sequences of instructions including instructions which, when executed on the target computer, cause the target computer to perform the method recited in claim 1.

5. A method of generating an output image from a source image, the output image having a lower resolution than that of the source image, the source image and the output image each having a plurality of pixels, the method comprising the steps of:

generating a thinned image having a plurality of pixels by discarding outer pixels of the source image;

generating a first output image having a plurality of pixels by subsampling the pixels of the thinned image;

generating an averaged image having a plurality of pixels, wherein each pixel of the averaged image is generated as an average of a subset of the pixels in the source image; and generating a final output image based on the first output image and the averaged image.

6. A method according to claim 5, further comprising the step of generating a second output image from the averaged image by increasing the intensity of the pixels of the averaged image, wherein the step of generating a final output image comprises generating the final output image as a function of the first output image and the second output image.

7. A method according to claim 5, wherein the step of generating the final output image comprises the step of generating each pixel of the final output image as the darker of the corresponding pixels in the first output image and the second output image.

8. A method of enabling a target computer to generate an output image from a source image, the method comprising the step of transmitting sequences of instructions from a host computer to a target computer, the sequences of instructions including instructions which, when executed on the target computer, cause the target computer to perform the method recited in claim 5.

9. A method of altering the resolution of an image, the method comprising:

providing a first image at a first resolution;

providing a second image at a second resolution, wherein the second resolution is different from the first resolution;

identifying a pattern in a source image; and assigning a value to a subset of an output image based on a relationship between the first image and the second image with respect to the pattern.

10. A method according to claim 9, wherein the step of identifying a pattern in the source image comprises the step of identifying a pattern of pixels within a region of the source image having a predetermined size and shape.

11. A method according to claim 10, wherein the subset of the output image is a pixel.

12. A method according to claim 10, wherein the step of assigning a value to a subset of the output image comprises the step of assigning a gray-scale value to a pixel of the output image.

13. A method according to claim 10, wherein the step of assigning a value to a subset of the output image comprises the step of assigning a value to the subset of the output image based on a relationship between:

at least one subset of the first image which represents the pattern; and at least one subset of the second image corresponding to said at least one subset of the first image.

14. A method according to claim 9, wherein the step of assigning a value to a subset of the output image comprises the step of assigning an intensity value to a subset of the output image, wherein the subset of the output image corresponds to the pattern in the source image.

15. A method of reducing the resolution of an image comprising:

providing a first image at a first resolution and at a second resolution, wherein the second resolution is lower than the first resolution;

identifying a pattern formed in each of a plurality of subsets of the first image at the first resolution, wherein each of the subsets of the first image at the first resolution corresponds to a particular subset of the first image at the second resolution;

for each pattern, computing an expected value based on the subsets of the first image at the second resolution which correspond to said pattern;

storing each of the computed expected values in a storage device in association with a corresponding one of the patterns;

identifying a pattern in each of a plurality of subsets of a source image; and for each of the subsets of the source image:

retrieving from the storage device the expected value corresponding to the pattern of said subset of the source image; and assigning an intensity value to a subset of the output image based on the expected value retrieved from the storage device.

16. A method according to claim 15, wherein each subset of the image at the first resolution includes a greater number of pixels than each corresponding subset of the image at the second resolution.

17. A method according to claim 15, wherein each of the subsets of the source image corresponds in size and shape to each of the subsets of the image at the first resolution.

18. A method according to claim 15, wherein the step of assigning an intensity value to a subset of the output image comprises the step of assigning a gray-scale intensity value to a subset of the output image based on the expected value retrieved from the storage device.

19. A method of generating an output image based on a source image, such that the output image has a lower resolution than that of the source image, the source image and the output image each including a plurality of pixels, the method comprising:

providing a first set of pixels representing an image at a first resolution;

providing a second set of pixels representing the image at a second resolution, wherein the second resolution is lower than the first resolution;

identifying a pattern formed by the pixels in each of a plurality of subsets of the first set of pixels, wherein each of the subsets of the first set of pixels corresponds to a particular subset of the second set of pixels;

for each pattern identified in the identifying step, computing an expected value of the subsets of the second set of pixels which correspond to said pattern;

storing each of the expected values in a storage device in association with a corresponding one of the patterns;

identifying a pattern formed by the pixels in each of a plurality of subsets of the source image;

for each of the subsets of the source image, retrieving from the storage device the expected value corresponding to the pattern of said subset of the source image; and for each of the subsets of the source image, assigning a gray-scale value to a subset of the output image based on the expected value retrieved from the storage device.

20. A method according to claim 19, wherein the subset of the output image in the assigning step is a pixel of the output image.

* * * * *